US009989133B2

(12) United States Patent
Wu (10) Patent No.: US 9,989,133 B2
(45) Date of Patent: Jun. 5, 2018

(54) MODULAR ACTUATOR (71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 5 days.

(21) Appl. No.: 15/274,166

(22) Filed: Sep. 23, 2016

(65) Prior Publication Data
US 2018/0045285 A1 Feb. 15, 2018

(30) Foreign Application Priority Data

Aug. 12, 2016 (TW) .............................. 105212302 U (51) Int. Cl.
*F16H 25/20* (2006.01)
*F16H 57/039* (2012.01)
*F16H 57/021* (2012.01)
*F16H 1/20* (2006.01)

(52) U.S. Cl.
CPC ............ *F16H 25/20* (2013.01); *F16H 1/203* (2013.01); *F16H 57/021* (2013.01); *F16H 57/039* (2013.01); *F16H 2025/209* (2013.01); *F16H 2025/2031* (2013.01); *F16H 2025/2084* (2013.01); *F16H 2057/0213* (2013.01)

(58) Field of Classification Search
CPC ....... F16H 2025/209; F16H 2025/2081; F16H 2025/2031
See application file for complete search history.

(56) References Cited

U.S. PATENT DOCUMENTS

| 2,398,841 | A | * | 4/1946 | Morris | ...................... | F16H 1/16 |
| | | | | | | 74/89.37 |
| 2,918,786 | A | * | 12/1959 | Geyer | ..................... | F15B 13/10 |
| | | | | | | 60/718 |
| 3,798,983 | A | * | 3/1974 | Smith | ....................... | F16H 1/16 |
| | | | | | | 74/89.35 |
| 2008/0210029 | A1 | * | 9/2008 | Wang | ..................... | F16H 25/20 |
| | | | | | | 74/89.38 |
| 2009/0247365 | A1 | * | 10/2009 | Di Stefano | ............. | B60T 13/02 |
| | | | | | | 477/197 |
| 2009/0293655 | A1 | * | 12/2009 | Tseng | .................. | F16H 25/2015 |
| | | | | | | 74/89.37 |

(Continued)

Primary Examiner — William Kelleher
Assistant Examiner — Gregory T Prather
(74) Attorney, Agent, or Firm — Chun-Ming Shih; HDLS IPR Services (57) ABSTRACT A modular actuator (1) includes an actuation module (10), a gear module (20) and a telescoping module (30). The actuation module (10) includes a motor (11) and a drive worm (12) driven by the motor (11). The gear module (20) includes a gearbox (21) and a deceleration gear assembly (22) disposed in the gearbox (21). The deceleration gear assembly (22) includes a deceleration worm gear (221) engaged with the drive worm (12) and includes a deceleration worm (222) driven to rotate by the deceleration worm gear (221). The telescoping module (30) includes a drive worm gear (31), a lead screw (32) driven to rotate by the drive worm gear (31), and an extendable pipe (33) threadedly connected to the lead screw (32). The drive worm gear (31) is engaged with the deceleration worm (222), and the lead screw (32) is arranged parallel to the drive worm (13).

9 Claims, 6 Drawing Sheets (56) References Cited

U.S. PATENT DOCUMENTS

| | | | |
|---|---|---|---|
| 2010/0084230 A1* | 4/2010 | Yamasaki | F16D 65/18 188/162 |
| 2011/0056328 A1* | 3/2011 | Ko | A63B 22/0023 74/606 R |
| 2011/0132139 A1* | 6/2011 | Chiang | F16H 25/20 74/606 R |
| 2012/0096963 A1* | 4/2012 | Hung | F16H 25/20 74/89.38 |
| 2012/0222509 A1* | 9/2012 | Winther | F16H 25/20 74/89 |
| 2013/0319148 A1* | 12/2013 | Alfano | F16H 25/20 74/89.32 |
| 2013/0327168 A1* | 12/2013 | Wu | F16H 25/2015 74/89.37 |
| 2014/0196555 A1* | 7/2014 | Wu | F16H 25/20 74/89.23 |
| 2014/0290403 A1* | 10/2014 | Wu | F16H 25/2056 74/89.35 |
| 2014/0312724 A1* | 10/2014 | Hung | H02K 7/1166 310/78 |
| 2015/0204426 A1* | 7/2015 | Wu | F16H 25/20 74/89.28 |
| 2015/0316131 A1* | 11/2015 | Rousseau | F16H 25/20 74/89.23 |
| 2015/0330486 A1* | 11/2015 | Hu | F16H 25/20 74/89.14 |
| 2015/0377329 A1* | 12/2015 | Wu | F16H 25/20 74/89.38 |
| 2016/0146317 A1* | 5/2016 | Tseng | F16H 25/2454 74/89.37 |
| 2016/0273617 A1* | 9/2016 | Nickel | F16H 1/203 |
| 2017/0044805 A1* | 2/2017 | Deppe | E05B 81/28 |
| 2017/0184187 A1* | 6/2017 | Tseng | F16H 25/20 |
| 2018/0029508 A1* | 2/2018 | Carl | B60N 2/929 |

\* cited by examiner

MODULAR ACTUATOR

TECHNICAL FIELD

The present invention relates to an actuator and, in particular, to a modular actuator.

BACKGROUND

The linear actuators are extensively used in daily life. Devices/products utilize the linear actuators includes, for example, a massage chair, an electrically adjustable chair, an electric hospital bed, a treadmill, a foldable bed, furniture, and a lift mechanism. The linear actuator is typically used for position adjustment. A conventional linear actuator mainly utilizes a drive assembly including a drive motor, a worm, and a worm gear, so as to drive rotation of a lead screw. At the same time, by means of the lead screw, an extendable pipe threadedly fastened to the lead screw extends or retracts with respect to an outer pipe receiving the extendable pipe.

The conventional linear actuator includes many parts inside. If it also has a gearbox (a deceleration gear assembly), assembling will take more time and often have more problems. In other words, assembling is time-consuming and costly. On the other hand, in small-size electronic products, the linear actuator has to be miniaturized to save space and reduce costs.

Accordingly, it is the aim of the present invention to solve the above-mentioned problems, on the basis of which the present invention is accomplished.

SUMMARY

It is an object of the present invention to provide a modular actuator with a simplified structure and a small size while reducing assembling time and problems.

Accordingly, the present invention provides a modular actuator comprising an actuation module, a gear module, and a telescoping module. The actuation module includes a motor and a drive worm driven by the motor. The gear module includes a gearbox and a deceleration gear assembly disposed in the gearbox. The deceleration gear assembly includes a deceleration worm gear engaged with the drive worm and includes a deceleration worm driven to rotate by the deceleration worm gear. The telescoping module includes a drive worm gear, a lead screw driven to rotate by the drive worm gear, and an extendable pipe threadedly connected to the lead screw. The drive worm gear is engaged with the deceleration worm, and the lead screw is arranged parallel to the drive worm.

Compared with conventional techniques, the actuation module serving as a power source of the actuator of the present invention is modularized, so that assembling can be carried out without necessarily assembling the motor and the drive worm gear separately, thereby achieving easy and efficient assembling. Further, the deceleration gear assembly of the actuator is a modularized gear set, so assembling can be carried out by simply engaging the deceleration worm gear with the drive worm, thereby reducing considerable assembling time during production. Moreover, in the modular actuator of the present invention, the telescoping module for linear movement is also modularized, so assembling can be carried out by simply engaging the drive worm gear with the deceleration worm, thus saving assembling time, reducing assembling problems, and enhancing industrial practicability.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
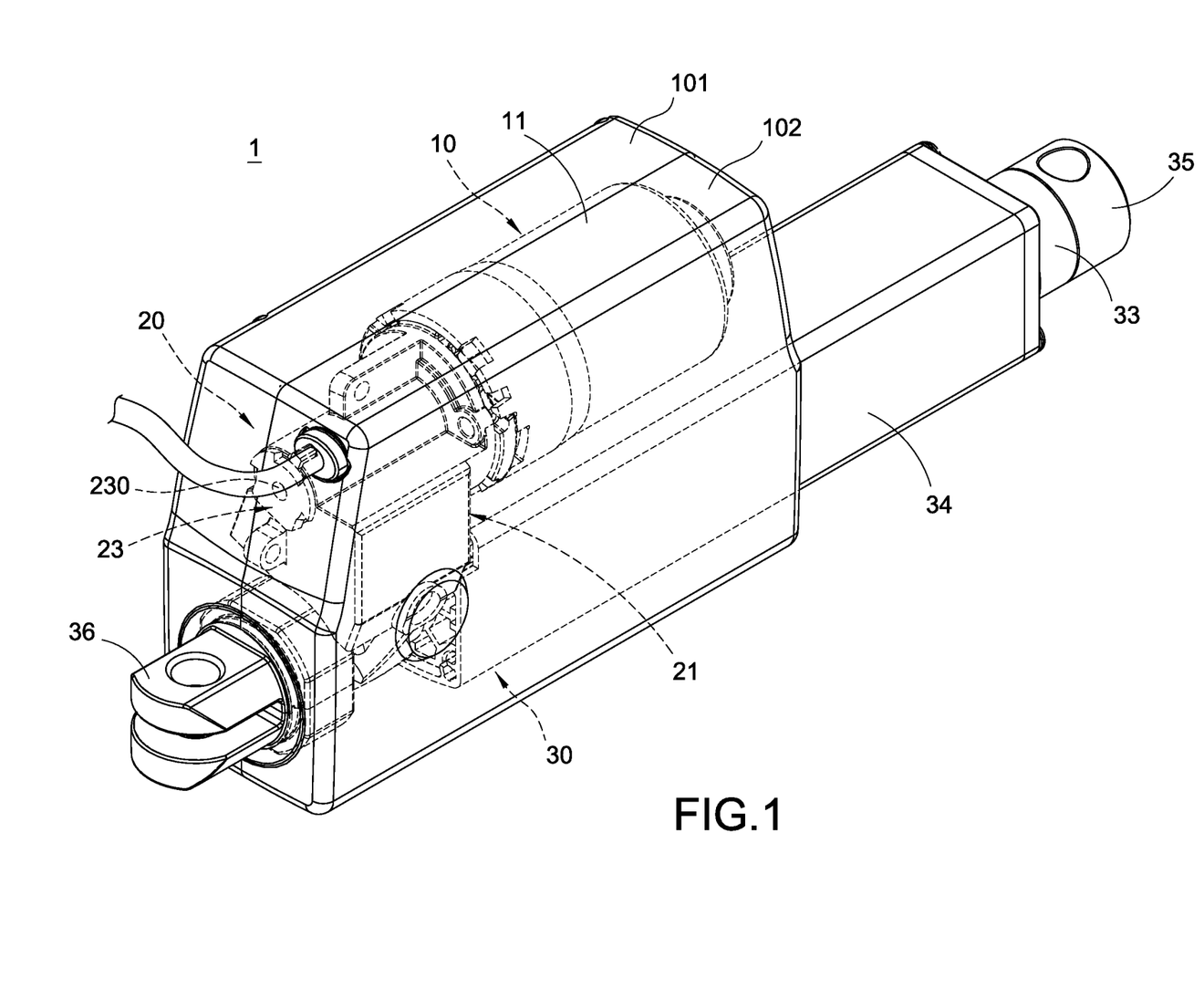
FIG. 1 is a perspective view of a modular actuator according to the present invention.
Figure 2:
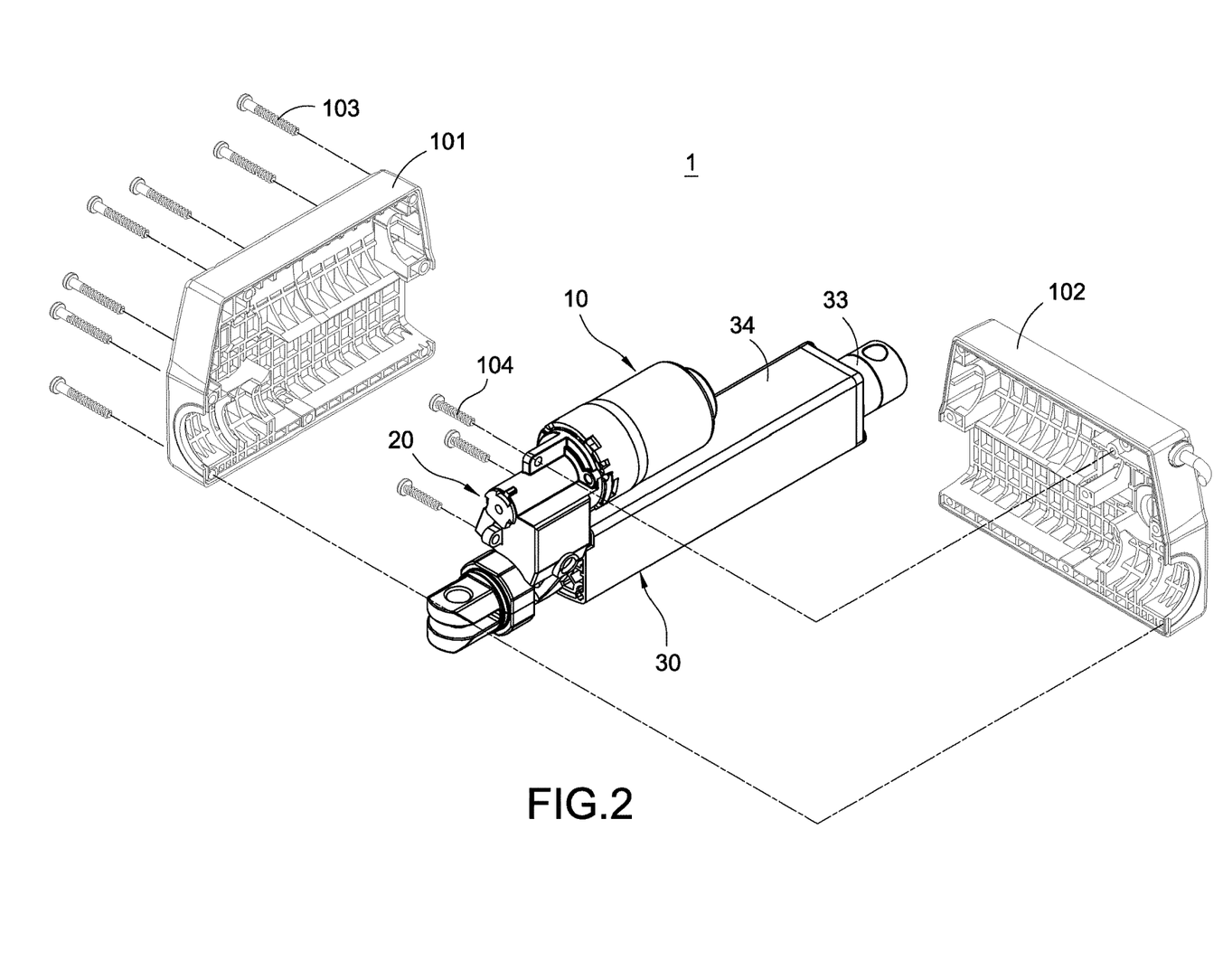
FIG. 2 is a perspective exploded view of the modular actuator.

Please refer to FIGS. 1 to 2, which are a perspective view and a perspective exploded view illustrating a modular actuator of the present invention. The modular actuator 1 of the present invention includes an actuation module 10, a gear module 20, and a telescoping module 30. The actuation module 10 is disposed over the telescoping module 30 and is arranged parallel to the telescoping module 30. Furthermore, the gear module 20 is disposed between the actuation module 10 and the telescoping module 30. The actuation module 10 drives the telescoping module 30 to move linearly by means of the gear module 20.

In the present embodiment, the modular actuator 1 further includes a first housing 101 and a second housing 102. The first housing 101 and the second housing 102 are joined to each other by means of a plurality of screws 103. The actuation module 10 and the gear module 20 are disposed inside the first housing 101 and the second housing 102. The gear module 20 is threadedly fastened to one side of the second housing 102 by means of at least one screw 104. The telescoping module 30 partially protrudes out of the first housing 101 and the second housing 102. The telescoping module 30 can move linearly with respect to the first housing 101 and the second housing 102. The structure of the modular actuator 1 is more fully detailed hereinafter.

Figure 3:
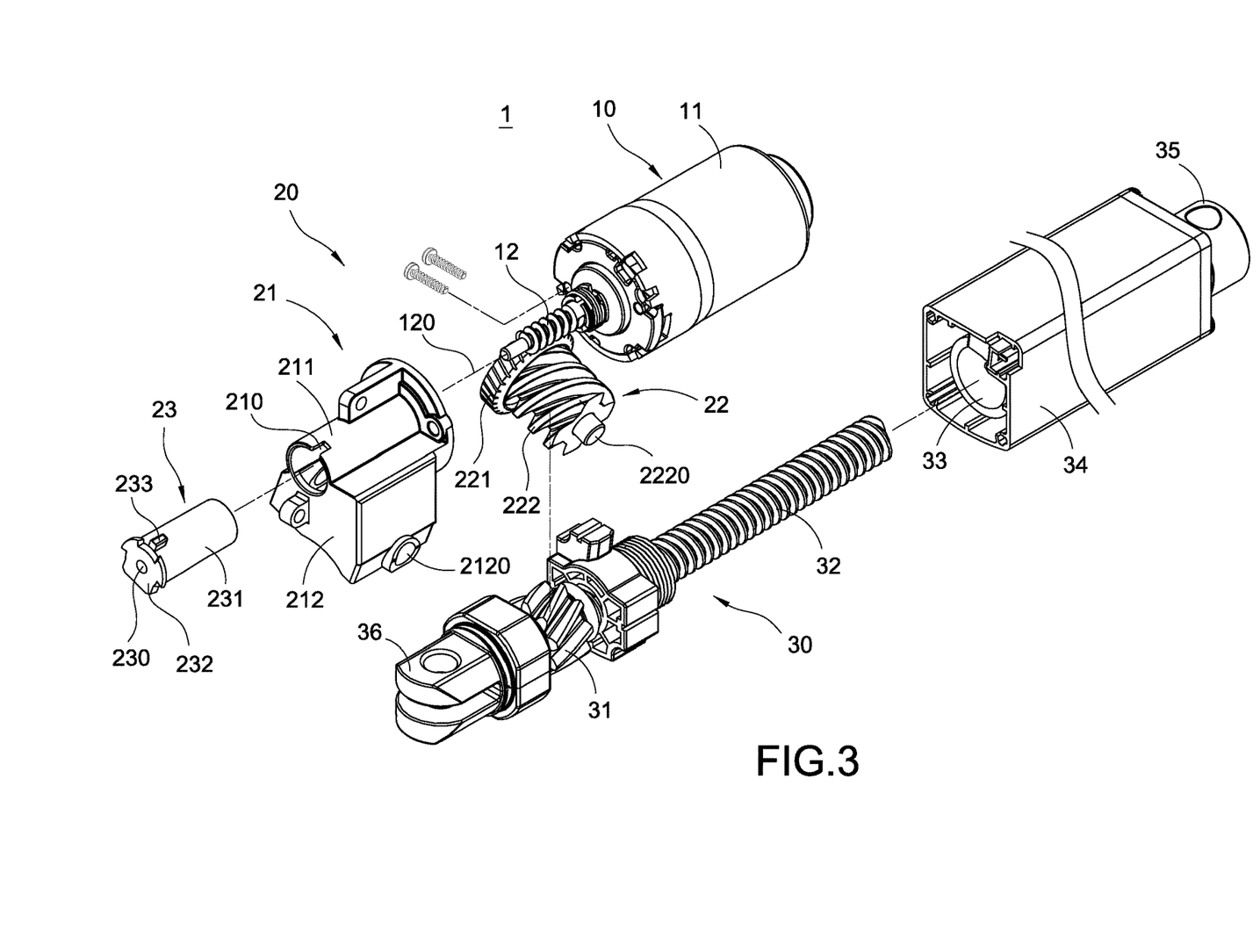
FIG. 3 is a perspective exploded view of the modular actuator.
Figure 4:
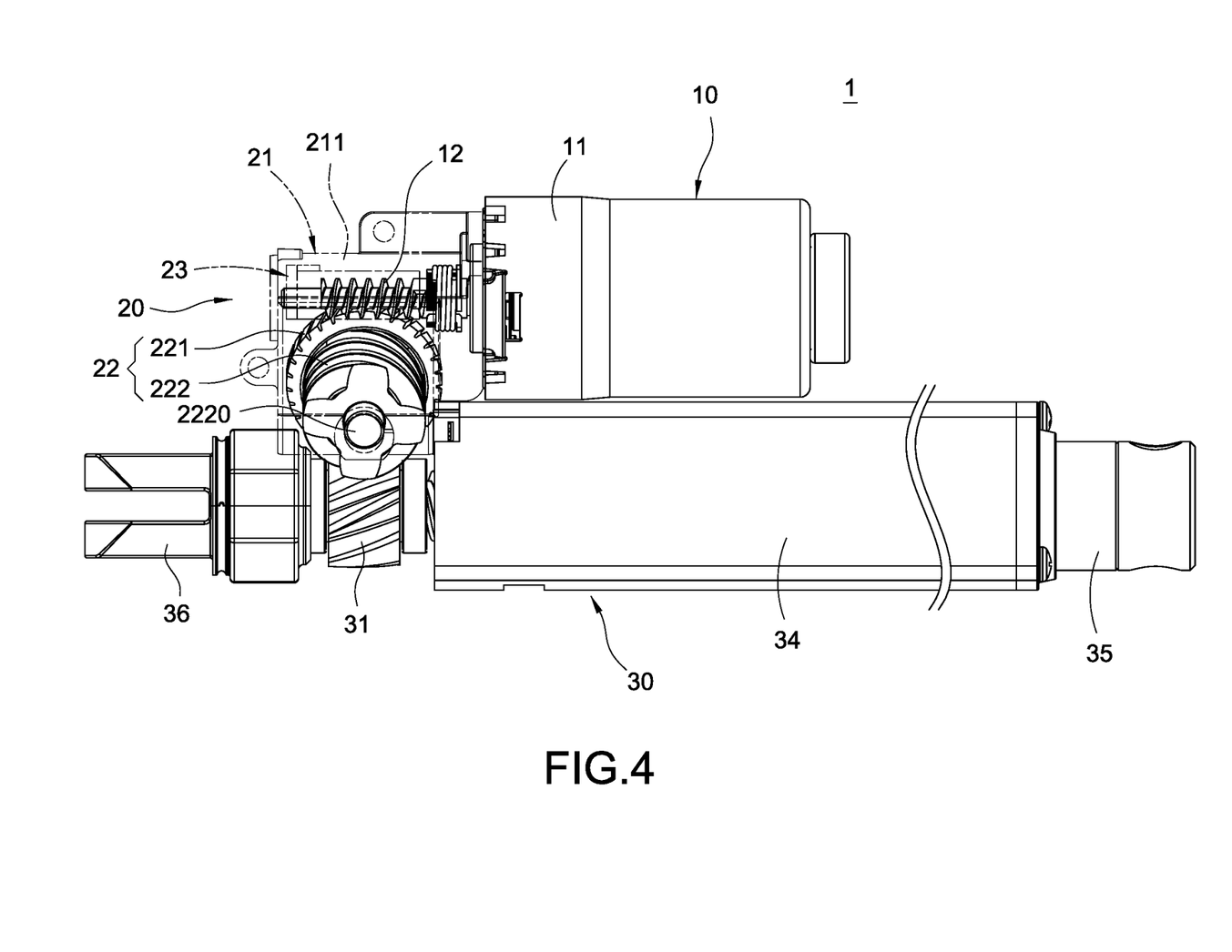
FIG. 4 is a lateral view illustrating the inside of the modular actuator.

Please refer to FIGS. 3 and 4, which are a perspective exploded view and a lateral view illustrating the modular actuator 1 of the present invention. The actuation module 10 includes a motor 11 and a drive worm 12 driven by the motor 11. The gear module 20 includes a gearbox 21 and a deceleration gear assembly 22 disposed in the gearbox 21. The deceleration gear assembly 22 includes a deceleration worm gear 221 engaged with the drive worm 12 and includes a deceleration worm 222 driven to rotate by the deceleration worm gear 221. Furthermore, the extendable module 30 includes a drive worm gear 31, a lead screw 32 driven to rotate by the drive worm gear 31, and an extendable pipe 33 threadedly connected to the lead screw 32. The drive worm gear 31 is engaged with the deceleration worm 222, and the lead screw 32 is arranged parallel to the drive worm 12.

The first housing 101 and the second housing 102 are joined to each other along an extending direction of the lead screw 32, so as to reduce an overall size of the modular actuator 1.

According to one embodiment of the present invention, the gear module 20 further includes a worm bushing 23. The worm bushing 23 is connected to one side of the gearbox 21, an end face of the worm bushing 23 includes a shaft hole 230, the drive worm 12 is inserted in the gearbox 21, and one end of the drive worm 12 is inserted through the shaft hole 230. Accordingly, the worm bushing 23 can support the drive worm 12, so that the drive worm 12 can stably rotate in the gearbox 21 to drive the deceleration gear assembly 22.

To be specific, the worm bushing 23 includes a tube 231 and a support plate 232 covering an end face of the tube 231, and the shaft hole 230 is disposed on the support plate 232. Furthermore, the gearbox 21 includes a sleeve 211 covering the drive worm 12 and includes a base housing 212 accommodating the deceleration gear assembly 22, and the worm bushing 23 is connected to an internal surface of the sleeve 211. It is preferable that the sleeve 211 includes a notch 210, the worm bushing 23 includes a bump 233 corresponding to the notch 210, and the worm bushing 23 is connected to the sleeve 211 through engagement of the bump 233 with the notch 210.

In the present embodiment, the base housing 212 includes a second shaft hole 2120, and the deceleration worm 222 includes a wheel shaft 2220, and one end of the wheel shaft 2220 is inserted through the second shaft hole 2120. Accordingly, the deceleration worm 222 can stably rotate in the base housing 212 to drive the telescoping module 30 to move linearly.

The telescoping module 30 further includes an outer pipe 34, a front abutment portion 35 and a rear abutment portion 36. The extendable pipe 33 is inserted in the outer pipe 34 and is driven by the lead screw 32 to be movable with respect to the outer pipe 34. Moreover, the front abutment portion 35 is connected to an outer end of the extendable pipe 33, and the rear abutment portion 36 is coupled to a rear end of the drive worm gear 31. The front abutment portion 35 is adapted for coupling an object (not illustrated) to be moved. The rear abutment portion 36 is adapted for fixing and supporting the modular actuator 1.

Figure 5:
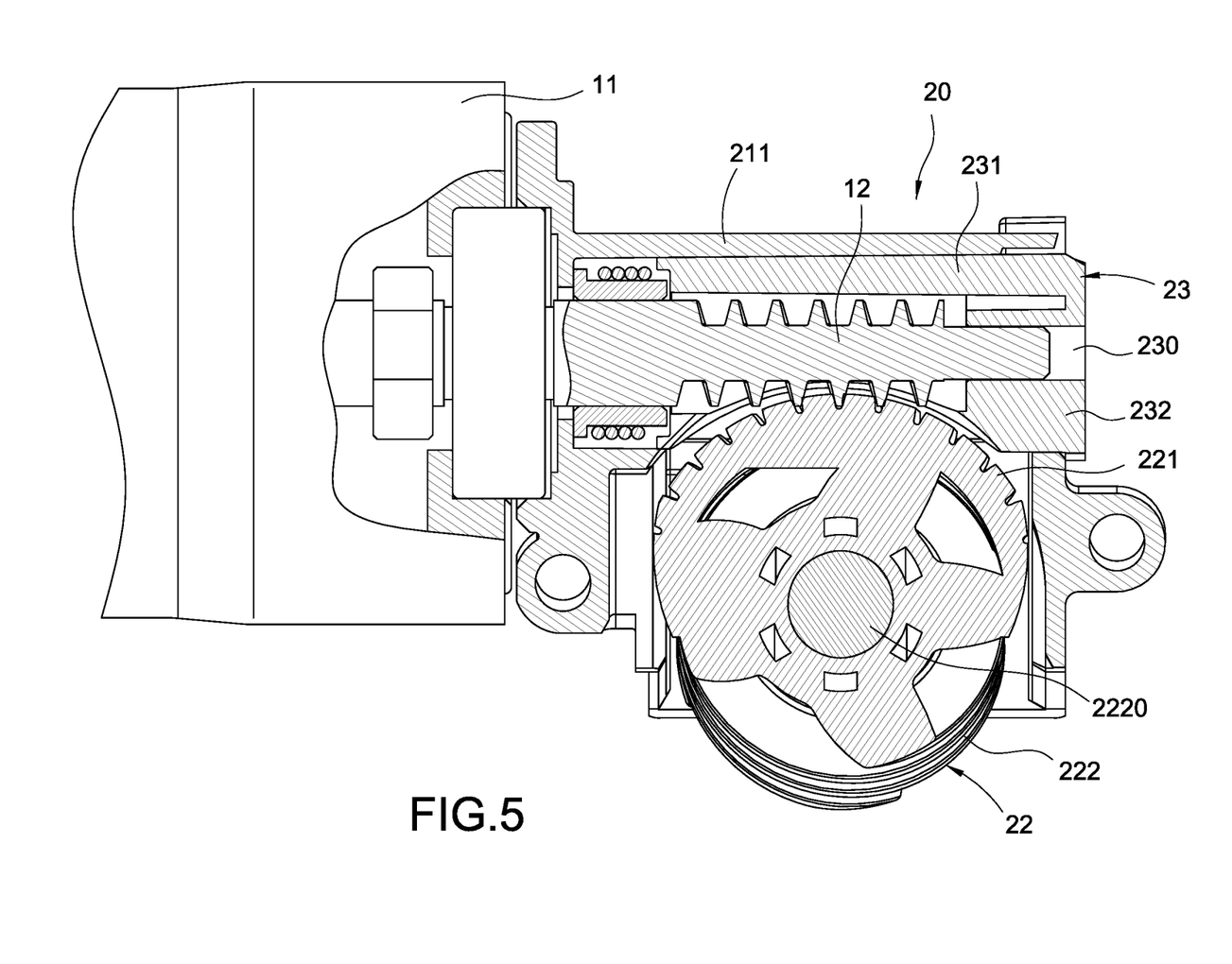
FIG. 5 is a partial cross-sectional view from a lateral direction, illustrating the modular actuator.
Figure 6:
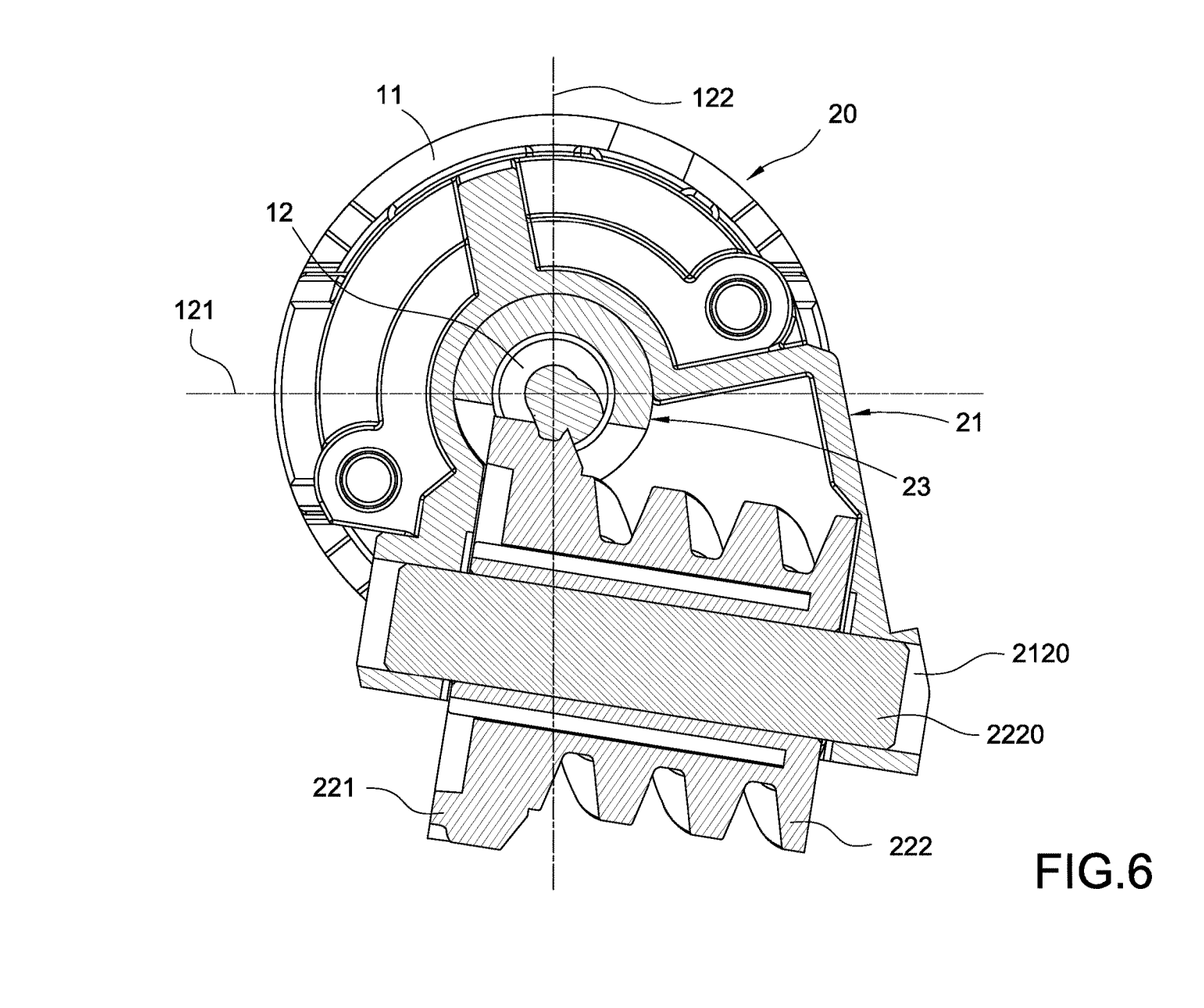
FIG. 6 is a cross-sectional view from another lateral direction, illustrating the modular actuator.

Please refer to FIGS. 5 and 6 of the modular actuator, which are a partial cross-sectional view from a lateral direction and a cross-sectional view from another lateral direction. As shown in FIG. 5, the drive worm 12 is engaged with the deceleration worm gear 221, and the deceleration worm gear 221 drives rotation of the deceleration worm 222, so as to achieve motion transmission and deceleration. Furthermore, one end of the drive worm 12 is inserted through the shaft hole 230 of the worm bushing 23. The worm bushing 23 can support the drive worm 12 to rotate stably to drive the deceleration worm gear 221 and the deceleration worm 222.

Referring to FIG. 6, according to one embodiment of the present invention, the drive worm 12 has an axial direction 120, and a horizontal direction 121 and a vertical direction 122 perpendicular to the axial direction 120. It should be noted that, an axis direction of the wheel shaft 2220 of the deceleration worm 222 is inclined with respect to the horizontal direction 121 of the drive worm 12, thus facilitating stable motion transmission.

In summary, the modular actuator 1 of the present invention is constituted by the actuation module 10, the gear module 20 and the telescoping module 30. The modular actuator 1 simplifies the assembling time, reduces production costs, and has excellent industrial practicability by means of its modular design.

It is to be understood that the above descriptions are merely the preferable embodiment of the present invention and are not intended to limit the scope of the present invention. Equivalent changes and modifications made in the spirit of the present invention are regarded as falling within the scope of the present invention.

What is claimed is:

1. A modular actuator (1), comprising:
an actuation module (10) including a motor (11) and a drive worm (12) driven by the motor (11);
a gear module (20) including a gearbox (21) and a deceleration gear assembly (22) disposed in the gearbox (21), the deceleration gear assembly (22) including a deceleration worm gear (221) engaged with the drive worm (12) and including a deceleration worm (222) driven to rotate by the deceleration worm gear (221);
a telescoping module (30) including a drive worm gear (31), a lead screw (32) driven to rotate by the drive worm (31), and an extendable pipe (33) threadedly connected to the lead screw (32), the drive worm gear (31) being engaged with the deceleration worm (222), and the lead screw (32) being arranged parallel to the drive worm (12), and
a first housing (101) and a second housing (102), the first housing (101) and the second housing (102) being joined to each other along an extending direction of the lead screw (32), the gear module (20) being disposed between the first housing (101) and the second housing (102), and being fastened to one side of the second housing (102) by at least one screw (104).

2. The modular actuator (1) of claim 1, wherein the gear module (20) includes a worm bushing (23), the worm bushing (23) is connected to one side of the gearbox (21), an end face of the worm bushing (23) includes a shaft hole (230), the drive worm (12) is inserted in the gearbox (21), and one end of the drive worm (12) is inserted through the shaft hole (230).

3. The modular actuator (1) of claim 2, wherein the worm bushing (23) includes a tube (231) and a support plate (232) covering an end face of the tube (231), and the shaft hole (230) is disposed on the support plate (232).

4. The modular actuator (1) of claim 2, wherein the gearbox (21) includes a sleeve (211) covering the drive worm (12) and includes a base housing (212) accommodating the deceleration gear assembly (22), and the worm bushing (23) is connected to an internal surface of the sleeve (211).

5. The modular actuator (1) of claim 4, wherein the sleeve (211) includes a notch (210), the worm bushing (23) includes a bump (233) corresponding to the notch (210), and the worm bushing (23) is connected to the sleeve (211) through engagement of the bump (233) with the notch (210).

6. The modular actuator (1) of claim 4, wherein the base housing (212) includes a second shaft hole (2120), and the deceleration worm (222) includes a wheel shaft (2220), and one end of the wheel shaft (2220) is inserted through the second shaft hole (2120).

7. The modular actuator (1) of claim 6, wherein the drive worm (12) has an axial direction (120), and a horizontal direction (121) and a vertical direction (122) perpendicular to the axial direction (120), an axis direction of the wheel shaft (2220) being inclined with respect to the horizontal direction (121) of the drive worm (12).

8. The modular actuator (1) of claim 1, wherein the telescoping module (30) further includes an outer pipe (34), and the extendable pipe (33) is inserted in the outer pipe (34) to be movable with respect to the outer pipe (34).

9. The modular actuator (1) of claim 1, wherein the telescoping module (30) further includes a front abutment portion (35) and a rear abutment portion (36), the front abutment portion (35) is connected to an outer end of the extendable pipe (33), and the rear abutment portion (36) is coupled to a rear end of the drive worm gear (31).

* * * * *